United States Patent [19]

DeRegnaucourt et al.

[11] E Re. 30,036

[45] Reissued Jun. 19, 1979

[54] VEHICLE WHEELS, SPACERS AND DUAL RIMS

[75] Inventors: Robert A. DeRegnaucourt, Centerville; John C. Hall, Moraine; Freddie R. Caudill, Dayton, all of Ohio

[73] Assignee: Dayton Walther Corporation, Dayton, Ohio

[21] Appl. No.: 905,659

[22] Filed: May 15, 1978

Related U.S. Patent Documents

Reissue of:

[64] Patent No.: 4,049,320
Issued: Sep. 20, 1977
Appl. No.: 592,506
Filed: Jul. 9, 1975

[51] Int. Cl.[2] ..... B60B 23/10

[52] U.S. Cl. ..... 301/13 SM; 301/18

[58] Field of Search ..... 301/10 R, 11 R, 12 R, 301/13 R, 13 SM, 18–20, 22–24, 36 R

[56] References Cited

U.S. PATENT DOCUMENTS

| | | | |
|---|---|---|---|
| Re. 20,022 | 6/1936 | Burger | 301/13 SM |
| 1,629,903 | 5/1927 | Benedict et al. | 301/36 R |
| 1,792,807 | 2/1931 | Brunner | 301/12 R X |
| 1,797,304 | 3/1931 | Waterbor | 301/12 R |
| 1,821,663 | 9/1931 | Murray, Jr. et al. | 301/19 |
| 1,827,790 | 10/1931 | Keller | 301/13 SM X |
| 1,952,075 | 3/1934 | Keller | 301/13 SM X |
| 1,956,428 | 4/1934 | Swain | 301/13 SM |
| 2,117,927 | 5/1938 | Walther | 301/12 R |
| 2,270,918 | 1/1942 | Ash | 301/13 R |

FOREIGN PATENT DOCUMENTS

| | | | |
|---|---|---|---|
| 801431 | 5/1936 | France | 301/12 R |

*Primary Examiner*—Robert J. Spar
*Assistant Examiner*—Charles A. Marmor
*Attorney, Agent, or Firm*—Mack D. Cook, II

[57] ABSTRACT

A vehicle wheel for dual mounting of inner and outer tire carrying rims having a radially inwardly projecting component using a spacer or separating means. The spacer may be conventional or may be one of the spacer embodiments disclosed herein. The wheel felloe portions have a concave and axially extending pocket therein housing the axially projecting component of a fastening assembly for locking the rims and spacer on the wheel. The axially inner end of the pocket terminates at a radially directed surface providing a mounting location for the fastening assembly axial component and intersecting a radially inclined felloe surface for seating the inner rim on the wheel. The axially outer end of the pocket has spaced-apart axially projecting wing portions for seating the outer rim on the wheel. The novel spacer embodiments are non-compressible and precisely located relative to a felloe portion pocket by engagement with a fastening assembly axial component [The novel] *In one form, the* tire carrying rims have radially inwardly projecting components adapted for doweled and tenoned engagement with a spacer embodiment carried by a fastening assembly axial component.

7 Claims, 13 Drawing Figures

FIG. 8
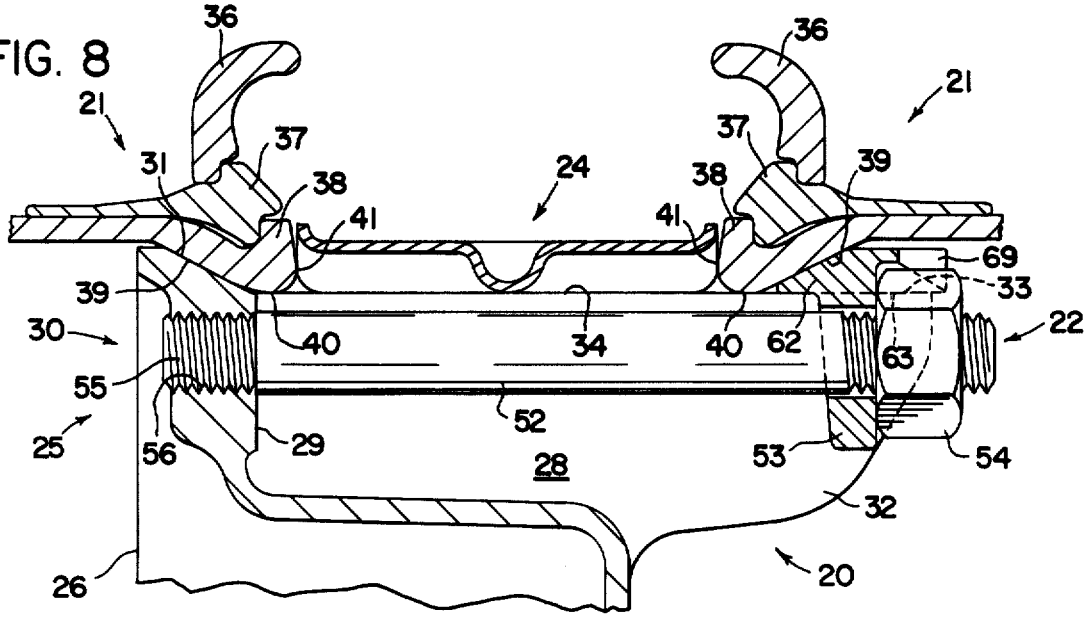
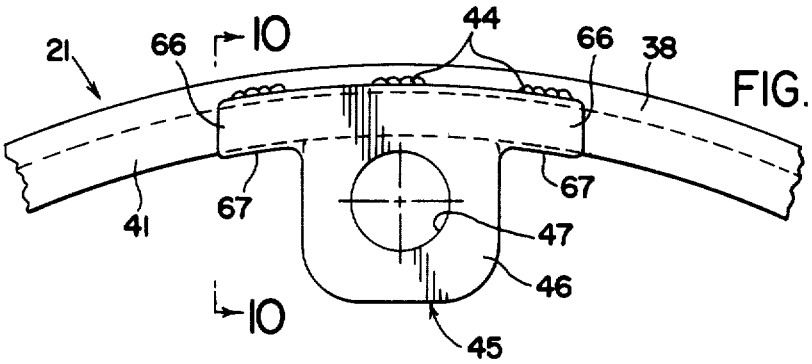
FIG. 9
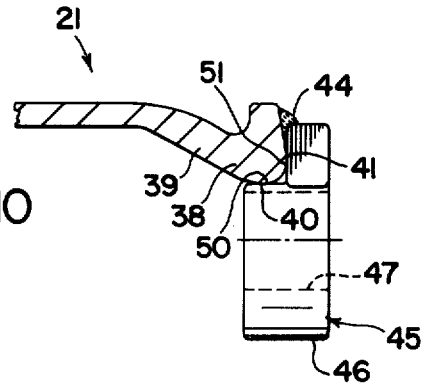
FIG. 10

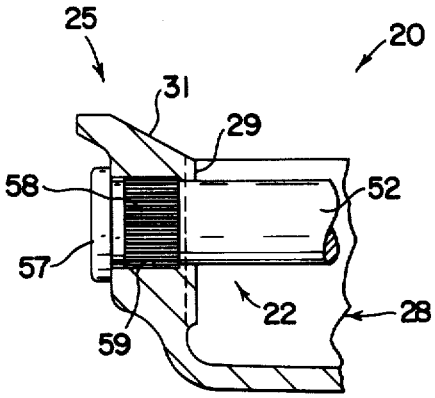
FIG. 11
FIG. 12
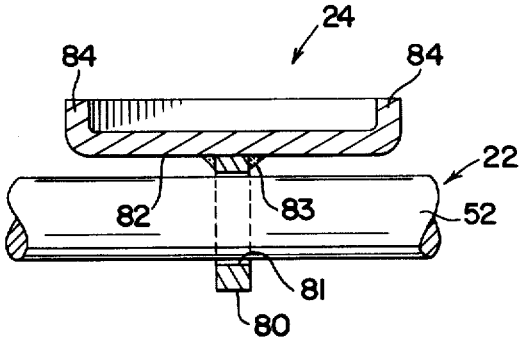
FIG. 13
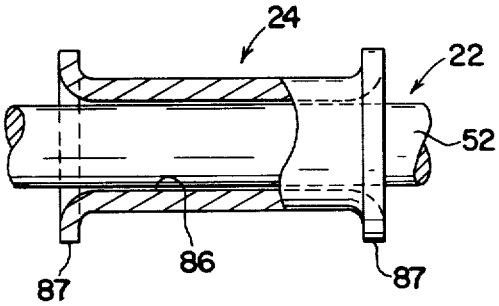

VEHICLE WHEELS, SPACERS AND DUAL RIMS

Matter enclosed in heavy brackets [ ] appears in the original patent but forms no part of this reissue specification; matter printed in italics indicates the additions made by reissue.

BACKGROUND OF THE INVENTION

The present invention relates to a vehicle wheel, spacers or separating means and tire carrying rims having radially inwardly projecting components thereon. The rims are dual mounted, inner and outer, on the wheel.

The vehicle wheel has a plurality of spaced-apart felloe portions for rim mounting and is preferably a spoked wheel. The spacers are non-compressible and comprise an individual element for each wheel felloe portion.

The prior art relating to vehicle wheels for carrying demountable rims and spacers or separating means therefor includes the patents to be found (the July, 1973, classification) in class 301, beginning with sub-class 10R. Generally relevant to the present invention are the patents relating to the mounting of plural or dual rims, inner and outer, normally found in sub-classes 13R and 13SM.

The accurate mounting of tire carrying rims on the felloe, felly or load bearing portion of a wheel has long been a problem in the art. Vehicle operators and industry regulations seek longer tire life and complete safety in operation, even under the most severe of vehicle operating conditions. The tire manufacturers are endeavoring to provide tires which have optimum performance characteristics, including lateral and radial balance. Consequently, it is being required that this art provide elements, the wheels, the rims, the fastening assemblies and the spacers, which do not deteriorate, hinder or impair the projected performance characteristics of the tires.

Heretofore, the wheel of a tire-rim-wheel assembly has been regarded primarily as a load carrying element attached to an axle of the vehicle and carrying the rim. The periphery of the wheel has felly surfaces to pilot or guide the rim into approximate mounting position. Thereafter, fastening means or assemblies are torqued down or tightened in such a manner that the tire carrying rim would not come loose from the wheel during use. If done correctly, as by an expert and conscientious mechanic, the prior art rim mounting techniques would not deteriorate, hinder or impair the performance characteristics of the tires. However, environmental or extrinsic factors such as warpage, deformation or damage to the rim and spacer or wear of the fastening means or assemblies could lead to relative displacement or non-alignment of the assembly components during fastening, creating conditions of what are now commonly referred to [an] *as* excessive lateral (axial) or radial runout, or an imbalance of the tire-rim-spacer-wheel assembly during vehicle operation.

The inventors have determined that the concepts of vehicle wheel, spacers, tire carrying rims and fastening assemblies disclosed herein will permit of improved rim mounting techniques.

A wheel and spacers according to the invention, when used with rims and fastening assemblies adapted thereto, should reduce lateral (axial) and radial runout, resist rim warpage or deformation, restrict rim rotation relative to the wheel and spacers and provide better balance for the tire-rim-spacer-wheel assembly during vehicle operation.

SUMMARY OF THE INVENTION

The object of the present invention is to provide an improved vehicle wheel, spacers, tire carrying rims and fastening assemblies adapted thereto.

It is a further object of the invention to provide an improved vehicle wheel and spacers for dual mounting of tire carrying rims having radially inwardly projecting components thereon. The mounting of such rims is greatly improved by creating and maintaining an operative relationship between the wheel felloe surfaces for rim seating, the location and position of the rims and spacer, and the location and function of the axially projecting components of the fastening assemblies for locking the rims and the spacers on the wheel.

These and other objects of the invention, as well as the advantages thereof, will be apparant in view of the detailed description of the various embodiments thereof as set forth below.

In general, a wheel according to the invention has a plurality of spaced-apart felloe portions. Each wheel felloe portion has a generally concave and axially extending pocket thereon for housing an axially projecting component of a fastening assembly for locking the rims and a spacer on the wheel. The axially inner end of each pocket has or terminates at a radially directed surface providing a mounting location for an axially projecting component of a fastening assembly. The radially directed surface intersects a radially inclined felloe surface for seating an inner rim. The axially outer end of the wheel felloe pocket has axially directed wing portions providing for dual axially oriented surfaces for seating an outer rim.

In general, a spacer according to the invention is non-compressible and comprises an individual element for each wheel felloe portion with a bore for receiving the shank of an axially projecting component of a fastening assembly for locking the rims on the wheel.

*In general, a tire carrying rim with radially inwardly projecting components thereon comprises a radially inclined axially inner surface tapering toward an adjacent radially inwardly directed portion oriented substantially perpendicular to the rotational axis of the rim and having a bore therein for receiving the axially projecting component of a fastening assembly.*

One form of tire carrying rim according to the invention has radially inwardly projecting components for doweled and tenoned engagement with a spacer carried by the axially projecting component of a fastening assembly.

DESCRIPTION OF THE DRAWINGS

FIG. 8 is a sectional view of the wheel of FIG. 4, mounting a conventional spacer and dual rims. Additional views include, FIG. 9, a fragmentary view of an improved tire carrying rim, according to the invention, taken substantially as indicated on line 9—9 of FIG. 10; and, FIG. 10 is a sectional view, taken substantially as indicated on line 10—10 of FIG. 9.

FIG. 11 is a fragmentary view of another technique for mounting the axially projecting component of a fastening assembly within a wheel felloe pocket.

FIG. 12 is a sectional view of another embodiment of a spacer, as shown in FIG. 1.

FIG. 13 is a sectional view of another embodiment of a spacer, as shown in FIG. 7.

DETAILED DESCRIPTION OF THE INVENTION

Figure 1:
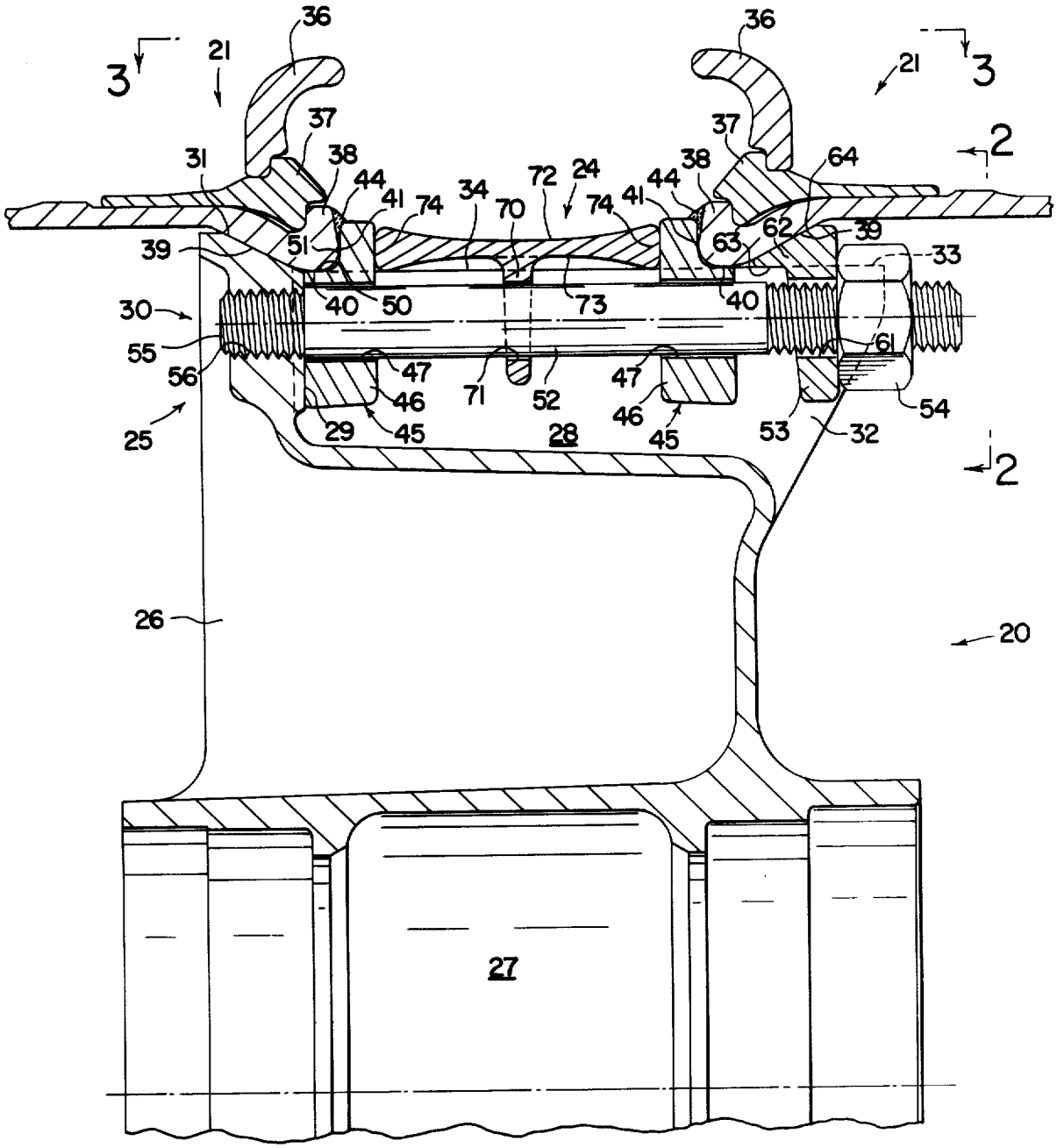
FIG. 1 is a sectional view of a vehicle wheel and one embodiment of a spacer, according to the invention, for mounting of dual inner and outer rims using fastening assemblies taken substantially as indicated on line 1—1 of FIG. 2.
Figure 2:
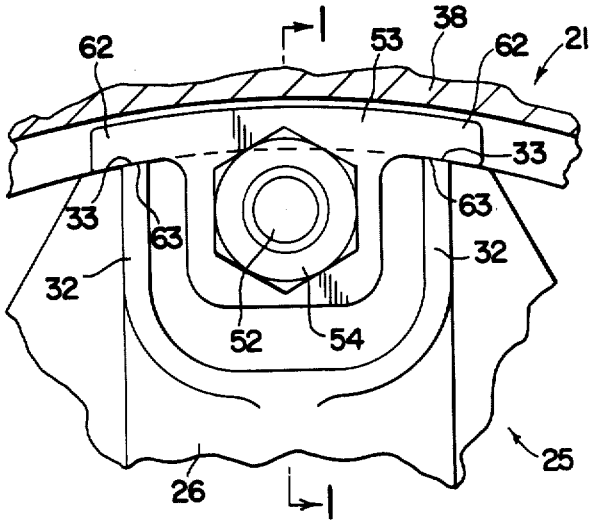
FIG. 2 is a fragmentary view, taken substantially as indicated on line 2—2 of FIG. 1; and, FIG. 3 is a view, taken substantially as indicated on line 3—3 of FIG. 1, showing details of the improved wheel and a spacer, but omitting the dual rims and certain components of a fastening assembly for purposes of clarity.

A wheel according to the invention is referred to generally by the numeral 20. A wheel 20 may be used for mounting of tire carrying rims referred to generally by the numeral 21. Fastening assemblies referred to generally by the numeral 22 are used for locking the rims 21 on a wheel 20. A non-compressible spacer or separating means for the rims 21 when seated on the wheel 20 is referred to generally by the numeral 24.

As shown, a wheel 20 has a plurality of spaced-apart felloe, felly or load bearing portions referred to generally by the numeral 25. Preferably, each felloe portion 25 is carried by a spoke member 26 extending radially from a conventional hub area 27 for attachment of the wheel 20 to a vehicle axle (not shown). Alternatively, the wheel 20 could be disc-shaped or have a substantially continuous periphery with the felloe portions 25 being formed thereon at regularly spaced intervals.

A wheel felloe portion 25 has a generally concave and axially extending outwardly opening pocket thereon referred to generally by the numeral 28.

The axially inner end of a pocket 28 terminates at a radially directed surface 29. Each surface 29 has a mounting location indicated generally at 30 for an elongated axially projecting component of a fastening assembly 22. The radially outer end of each surface 29 intersects a radially inclined surface 31 for seating an inner rim 21. Each inclined surface 31 extends outwardly away from the rotational axis of the wheel at a suitable angle.

The axially outer end of a pocket 28 has spaced-apart axially projecting wing portions 32 providing for outwardly facing dual axially oriented surfaces 33 for seating an outer rim 21.

Figure 3:
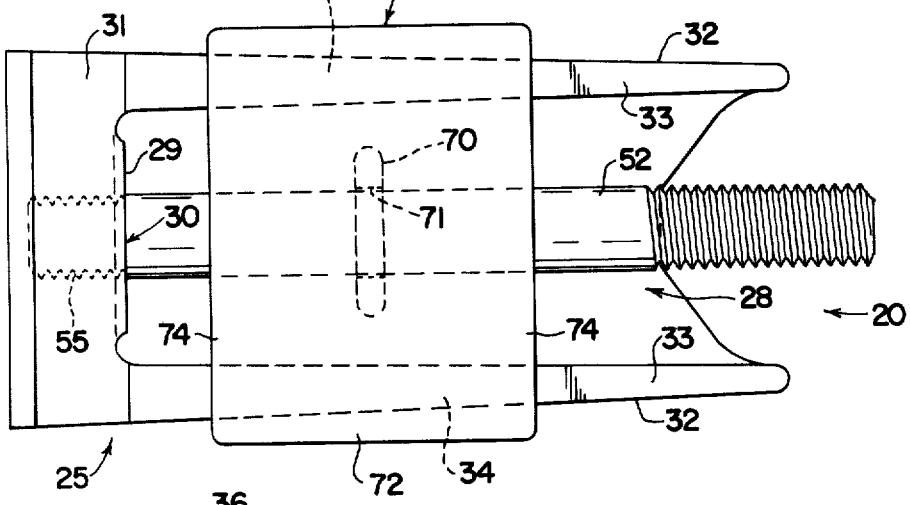

The medial sides of a pocket 28, between the radially directed surface 29 and the wing portions 32, have outwardly facing dual axially oriented surfaces 34, which may function to seat a spacer 24, as shown in FIGS. 1, 3 and 8, or the clamp lug (45) of FIG. 9.

[The] *As shown, the* tire carrying rims 21 have a fixed bead flange (not shown) and a removable bead flange 36 for seating the beads (not shown) of a tire in a conventional manner. The removable bead flange 36 has a transversely split lock ring 37 carried by an annular rim base edge portion 38.

A rim base edge portion 38 has a radially inclined axially inner surface 39 intersecting an axially oriented radially inner surface 40 intersecting a radially directed axially outer surface 41. On an inner rim 21, the radially inwardly facing surface 39 may conform to and be seated on the radially inclined surface 31 of a felloe portion 25. On an outer rim 21, the surface 39 may conform to and be seated on a radially inclined surface on a stud supported movable clamp element of a fastening assembly 22.

With the exception of the conventional rims 21, as shown in FIG. 8, a rim base edge portion 38 has securely attached or connected thereto, as by welds 44, clamp lugs referred to generally by the numeral 45. The radially inwardly directed leg portion 46 of each clamp lug 45 has a bore 47 therein for receiving the elongated axially projecting component of a fastening assembly 22. A clamp lug 45 preferably has an axially oriented surface 50 intersecting a radially directed surface 51, securely attached to the conforming surfaces 40 and 41 on the rim base edge portion 38, as by welds 44.

The fastening assembly 22 comprises an elongated stud 52 extending axially of a felloe pocket 28, a clamp element 53 and a rotatable nut 54. As shown in FIGS. 1, 4, 7 and 8, the elongated stud 52 has an inner end with peripheral threads 55 for mating engagement with bore threads 56 at a mounting location 30. Alternatively, as shown in FIG. 11, the elongated stud 52 may have an inner end with a cap head 57 and peripheral serrations 58 for mating engagement with a bore 59 at a mounting location 30. Still alternatively, the elongated studs 52 may be attached at a mounting location 30 as by a conventional arc stud or capacitor-discharge welds.

A clamp element 53 has a bore 61 for receiving the elongated stud 52. A clamp element 53 also has lateral wing portions 62 providing downwardly facing dual axially oriented surfaces 63 for seating on conforming wheel felloe surfaces 33. The radially outer portion of a clamp element 53 has a radially inclined surface 64 for mating engagement with a conforming outer rim base edge portion surface 39.

Figure 4:
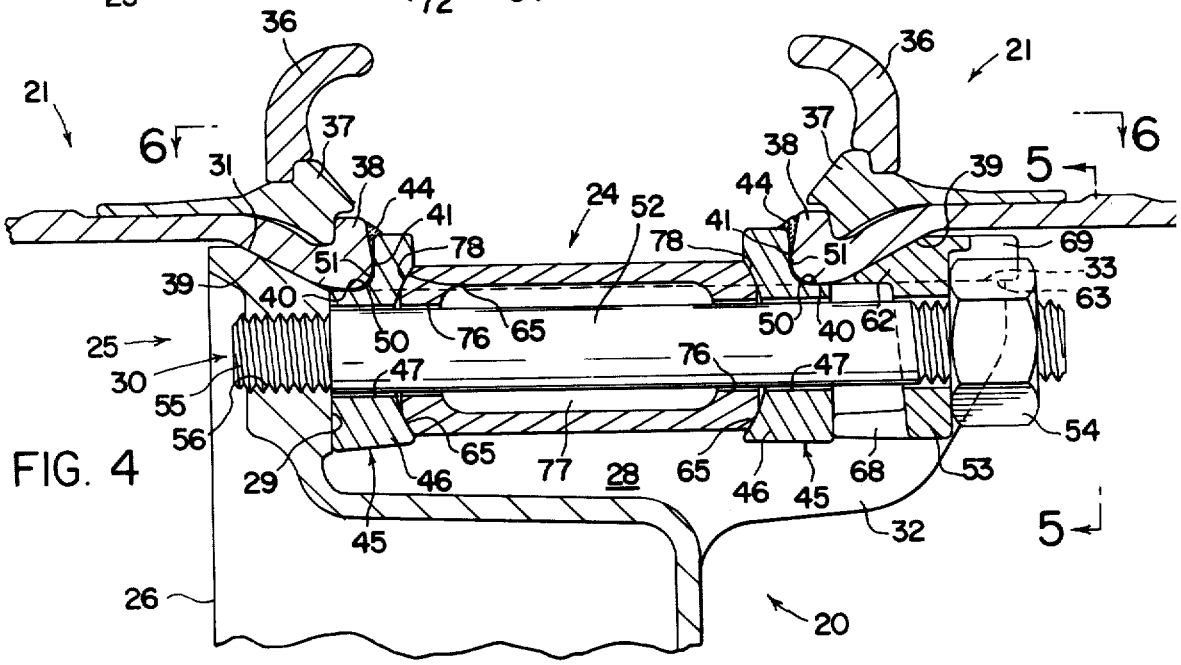
FIG. 4 is a sectional view of a wheel, another embodiment of a spacer and improved tire carrying rims, according to the invention, taken substantially as indicated on line 4—4 of FIG. 5.

Referring to FIG. 4, a clamp lug 45 may be modified according to the invention. As shown, the axially outer face of a leg portion 46 may have a concave area 65 formed coaxially around the bore 47 for mating engagement with a conforming surface on the ends of a spacer 22. Referring also to FIG. 9, a clamp lug 45 may also have lateral wing portions 66 adapted to extend radially on either side of a felloe pocket 28 and providing inwardly facing dual axially oriented surfaces 67 for seating on the wheel felloe surfaces 34.

Figure 5:
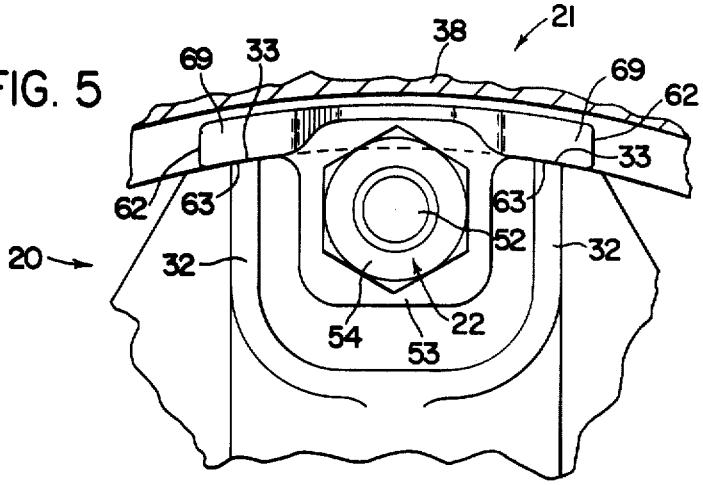
FIG. 5 is a fragmentary view, taken substantially as indicated on line 5—5 of FIG. 4; and, FIG. 6 is a view similar to FIG. 3, taken substantially as indicated on line 6—6 of FIG. 4.
Figure 6:
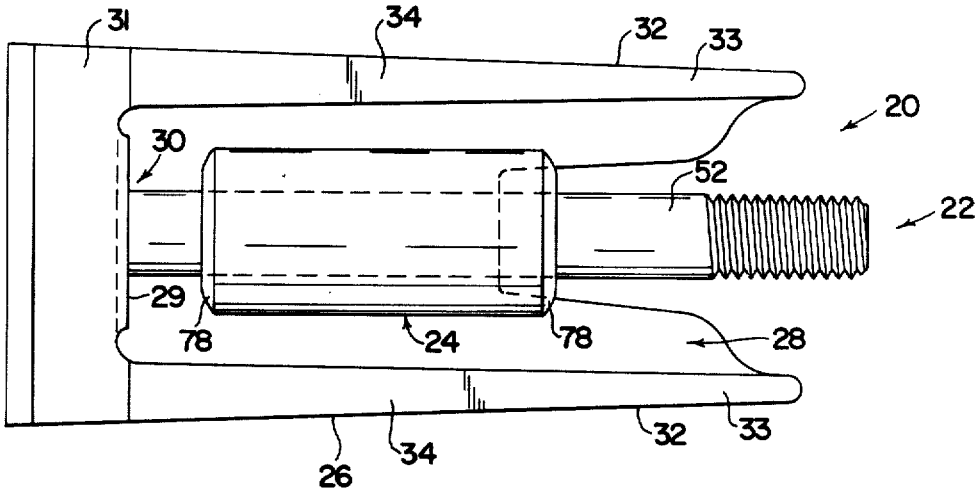
Figure 7:
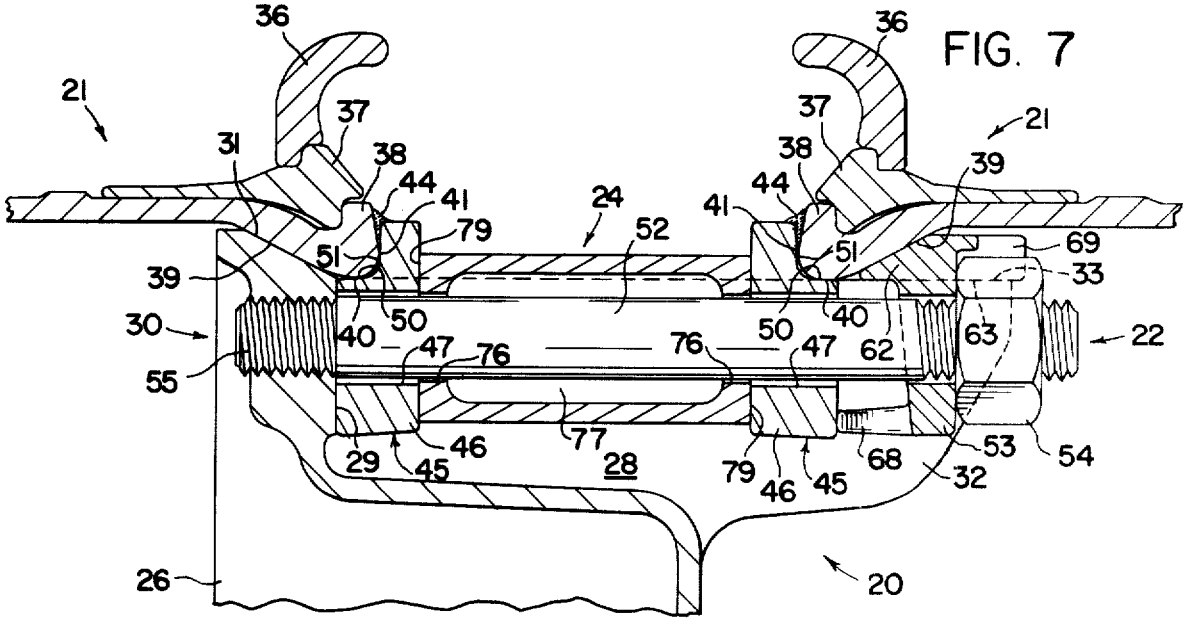
FIG. 7 is a sectional view of the wheel of FIG. 4, and another embodiment of a spacer.

Referring to FIGS. 4, 5 and 7, a clamp element 53 may be modified according to the invention. As shown, a clamp element 53 may have an axially inwardly directed member 68 for mating engagement against a clamp lug leg portion 46. Referring also to FIG. 8, the lateral wing portions 63 may have axially projecting dual extensions 69 providing for an axial extension of the surfaces 63 for seating on conforming wheel felloe surfaces 33.

Referring to FIG. 1, a spacer 24 according to the invention may have a radially inwardly projecting medial element 70 with a bore 71 therein for receiving the shank of an elongated stud 52 of a fastening assembly 22 and being retained thereby between the rims 21. As shown, the spacer 24 is generally T-shaped in cross section and for the purpose of weight reduction may have concave outer and under surfaces 72 and 73 tapered inwardly from lateral flange or marginal portions 74. The flange portions 74 each have radially directed edges for mating engagement with the opposed clamp lugs 45 carried by the inner and outer rims 21. As shown in FIG. 3, the length or radial extent of each such spacer 24 is such as to span the felloe pocket 28 and to seat the spacer on the felloe surfaces 34.

Referring to FIG. 4, a spacer 24 according to the invention may also be a cylindrical element having a bore 76 therein for receiving the shank of an elongated stud 52 of a fastening assembly 22 and being retained thereby between the rims 21. As shown, the spacer bore 76 may be cored as at 77 for the purpose of weight reduction. The spacer ends may have a convex area 78 formed coaxially around the bore 76 for mating engagement with the concave areas 65 on the clamp lugs 45 carried by the inner and outer rims 21. In this embodiment, the spacer elements 24 and clamp lugs 45 are in doweled and tenoned engagement around the elongated stud 52 of a fastening assembly 22 providing for a high degree of accuracy and precision in mounting and alignment of the inner and outer rims 21 on a wheel 20.

Referring to FIG. 7, a spacer 24 according to the invention may be another form of cylindrical element having a bore 76 therein for receiving the shank of an elongated stud 52 of a fastening assembly 22 and being retained thereby between the rims 21. As shown, the spacer bore 76 may be cored as at 77 for the purpose of weight reduction. The spacer ends may have radially directed surfaces 79 formed coaxially around the bore 76 for mating engagement with the opposed clamp lugs 45 carried by the inner and outer rims 21.

Referring to FIG. 8, a spacer 24 may be a prior art spacer as described and claimed in a co-pending U.S. patent application Ser. No. 530,532, *now U.S. Pat. No. Re. 28,993* to which reference is made for such further details as are necessary to understand the invention.

Referring to FIG. 12, a spacer 24 according to the invention may have a radially inwardly projecting medial element 80 with a bore 81 therein for receiving the shank of an elongated stud 52 of a fastening assembly 22 and being retained thereby between the rims 21. As shown, the spacer 24 is generally C-shaped in cross section and for the purpose of weight reduction may be a metal stamping with the medial element 80 secured to the under surface 82 as by a weld 83. This spacer 24 has lateral flange portions 84 with radially directed edges for mating engagement with the opposed clamp lugs (45) carried by the inner and outer rims (21). The length or radial extent of each such spacer 24 is such as to span the felloe pocket (28) and to seat the spacer on the felloe surfaces (34).

Referring to FIG. 13, a spacer 24 according to the invention may be another form of cylindrical element having a bore 86 therein for receiving the shank of an elongated stud 52 of a fastening assembly 22 and being retained thereby between the rims 21. As shown, the ends of the spacer bore 86 terminate in radially directed annular flanges 87 formed coaxially around the bore 86 providing a generally spool-shaped configuration for this spacer. This configuration is similar to the configuration of an element 11 as disclosed in U.S. Pat. No. 1,984,048, December /1934, class 301-13. The spacer flanges 87 are for mating engagement with the opposed clamp lugs 45 carried by the inner and outer rims 21.

In any embodiment of a rim 21, the clamp lugs 45 may be a series of individual elements. Alternatively, a clamp lug 45 may be an annular or substantially circumferentially continuous element having the radially inwardly projecting leg portions 46 thereon at spaced intervals.

In a wheel 20, the axially oriented surfaces 33 and 34, and the elongated axially projecting stud 52 of a fastening assembly 22, each preferably extend substantially parallel to the rotational axis of the wheel. Also, the radially directed surfaces 29 at the axially inner end of a felloe pocket 28 preferably extend substantially perpendicular to the rotational axis of the wheel.

What is claimed is:

1. A combination of dual inner and outer tire carrying rims separated by spacers and seated and locked by fastening assemblies on a vehicle wheel, said wheel having a plurality of spaced-apart felloe portions, each said felloe portion having an outwardly opening pocket thereon, the axially inner end of each said pocket terminating at a radially directed surface substantially perpendicular to the rotational axis of said wheel and providing a mounting location for an elongated axially projecting component of said fastening assemblies, each said radially directed surface intersecting a radially inclined felloe surface, the axially outer end of each said pocket having spaced-apart axially directed wing portions providing for outwardly facing dual axially oriented surfaces extending substantially parallel to the rotational axis of said wheel, each said rim having a rim base edge portion with a radially inclined axially inner surface intersecting an axially oriented radially inner surface intersecting a radially directed axially outer surface and a plurality of clamp lugs integrally secured to said radially directed axially outer surface, each said clamp lug having a radially inwardly directed leg portion substantially perpendicular to the rotational axis of each of said rims with a bore therein for receiving said elongated axially projecting component of said fastening assemblies, each said spacer being non-compressible and comprising an individual element for each said wheel felloe portion with a bore therein for receiving said elongated axially projecting component of said fastening assemblies and being retained thereby between said rims, each said fastening assembly comprising a threaded fastener and a clamp element supported by said threaded fastener, each said clamp element having lateral wing portions providing downwardly facing dual axially oriented surfaces, an axially inwardly directed member and a radially outer portion with a radially inclined surface, whereby, said rims when separated by said spacers are seated and locked on said wheel solely by tightening of each said fastening assembly, said radially inclined axially inner surface of said inner rim base edge portion being in mating engagement with each said radially inclined felloe surface, and said radially directed leg portion of one of said inner rim clamp lugs being in mating engagement with each said radially directed pocket surface, the axially inner end of each said spacer being in mating engagement with said radially directed leg portion of one of said inner rim clamp lugs, the axially outer end of each said spacer being in mating engagement with said radially directed leg portion of one of said outer rim clamp lugs, said radially inclined surface on each said clamp element on each said fastening assembly being in mating engagement with said radially inclined axially inner surface of said outer rim base edge portion, said downwardly facing dual axially oriented surfaces on said lateral wing portions of each clamp element on each said fastening assembly being in mating engagement with said outwardly facing dual axially oriented surfaces on said axially outer end of each said felloe pocket and said axially inwardly directed member on each said clamp element on each said fastening assembly being in mating engagement with said radially directed leg portion of one of said outer rim clamp lugs.

2. A combination of dual inner and outer tire carrying rims separated by spacers and seated and locked by fastening assemblies on a vehicle wheel, said wheel having a plurality of spaced-apart felloe portions, each said felloe portion having an outwardly opening pocket thereon, the axially inner end of each said pocket terminating at a radially directed surface substantially perpendicular to the rotational axis of said wheel and providing a mounting location for an elongated axially projecting component of said fastening assemblies, each said radially directed surface intersecting a radially inclined felloe surface, the axially outer end of each said pocket having spaced-apart axially directed wing portions providing for outwardly facing dual axially oriented surfaces extending substantially parallel to the rotational axis of said wheel, each said rim having a rim base edge portion with a radially inclined axially inner surface intersecting an axially oriented radially inner surface intersecting a radially directed axially outer surface and a plurality of clamp lugs integrally secured to said radially directed axially outer surface, each said clamp lug having a radially inwardly directed leg portion substantially perpendicular to the rotational axis of each of said rims with a bore therein for receiving said elongated axially projecting component of said fastening assemblies and a concave area formed coaxially around said bore, each said spacer being non-compressible and comprising an individual element for each said wheel felloe portion with a bore therein for receiving said elongated axially projecting component of said fastening assemblies and being retained thereby between said rims and with ends having a convex area formed coaxially around said bore, each said fastening assembly comprising a threaded fastener and a clamp element supported by said threaded fastener, each said clamp element having lateral wing portions providing downwardly facing dual axially oriented surfaces, an axially inwardly directed member, and a radially outer portion with a radially inclined surface, whereby, said rims when separated by said spacers are seated and locked on said wheel solely by tightening of each said fastening assembly, said spacers and said inner and outer rim clamp lugs being mounted in doweled and tenoned relation around said elongated axially projecting component of said fastening assemblies, said radially inclined axially inner surface of said inner rim base edge portions being in mating engagement with each said radially inclined felloe surface, and said radially directed leg portion of one of said inner rim clamp lugs being in mating engagement with each said radially directed pocket surface, said axially inner convex end of each said spacer being in mating engagement with said concave area of said radially directed leg portion of one of said inner rim clamp lugs, said axially outer convex end of each said spacer being in mating engagement with said concave area of said radially directed leg portion of one of said outer rim clamp lugs, said radially inclined surface on each said clamp element on each said fastening assembly being in mating engagement with said radially inclined axially inner surface of said outer rim base edge portion, said downwardly facing dual axially oriented surfaces on said lateral wing portions of each clamp element on each said fastening assembly being in mating engagement with said outwardly facing dual axially oriented surfaces on said axially outer end of each said felloe pocket and said axially inwardly directed member on each said clamp element on each said fastening assembly being in mating engagement with said radially directed leg portion of one of said outer rim clamp lugs.

3. A combination of dual inner and outer tire carrying rims separated by spacers and seated and locked by fastening assemblies on a vehicle wheel, said wheel having a plurality of spaced-apart felloe portions, each said felloe portion having an outwardly opening pocket thereon, the axially inner end of each said pocket terminating at a radially directed surface substantially perpendicular to the rotational axis of said wheel and providing a mounting location for an elongated axially projecting component of said fastening assemblies, each said radially directed surface intersecting a radially inclined felloe surface, the axially outer end of each said pocket having spaced-apart axially directed wing portions providing for outwardly facing dual axially oriented surfaces extending substantially parallel to the rotational axis of said wheel, the medial sides of each said pocket between said radially directed surface and said wing portions having outwardly facing dual axially oriented surfaces substantially parallel to the rotational axis of said wheel, each said rim having a rim base edge portion with a radially inclined axially inner surface intersecting an axially oriented radially inner surface intersecting a radially directed axially outer surface and a plurality of clamp lugs integrally secured to said radially directed axially outer surface, each said clamp lug having a radially inwardly directed leg portion substantially perpendicular to the rotational axis of each of said rims with a bore therein for receiving said elongated axially projecting component of said fastening assemblies and lateral wing portions providing inwardly facing dual axially oriented surfaces, each said spacer being non-compressible and comprising an individual element for each said wheel felloe portion with a bore therein for receiving said elongated axially projecting component of said fastening assemblies and being retained thereby between said rims, each said fastening assembly comprising a threaded fastener and a clamp element supported by said threaded fastener, each said clamp element having lateral wing portions providing downwardly facing dual axially oriented surfaces and a radially outer portion with a radially inclined surface, whereby, said rims when separated by said spacers are seated and locked on said wheel solely by tightening of each said fastening assembly, said radially inclined axially inner surface of each said inner rim base edge portion being in mating engagement with each said radially inclined felloe surface, and said radially directed leg portion of one of said inner rim clamp lugs being in mating engagement with said radially directed pocket surface, the axially inner end of each said spacer being in mating engagement with said radially directed leg portion of one of said inner rim clamp lugs, the axially outer end of each said spacer being in mating engagement with said radially directed leg portion of one of said outer rim clamp lugs, said radially inclined surface on each said clamp element on each said fastening assembly being in mating engagement with said radially inclined axially inner surface of said outer rim base edge portion, said downwardly facing dual axially oriented surfaces on said lateral wing portions of each clamp element on each said fastening assembly being in mating engagement with said outwardly facing dual axially oriented surfaces on said axially outer end of each said felloe pocket, said inwardly facing dual axially oriented surfaces on said lateral wing portions on each said inner and outer rim clamp lug being in mating engagement with said outwardly facing dual axially oriented surfaces on said medial sides of each said felloe pocket.

4. A combination of dual inner and outer tire carrying rims separated by spacers and seated and locked by fastening assemblies on a vehicle wheel, said wheel having a plurality of spaced-apart felloe portions, each said felloe portion having an outwardly opening pocket thereon, the axially inner end of each said pocket terminating at a radially directed surface substantially perpendicular to the rotational axis of said wheel and providing a mounting location for an elongated axially projecting component of said fastening assemblies, each said radially directed surface intersecting a radially inclined felloe surface, the axially outer end of each said pocket having spaced-apart axially directed wing portions providing for outwardly facing dual axially oriented surfaces extending substantially parallel to the rotational axis of said wheel, the medial sides of each said pocket between said radially directed surface and said wing portions having outwardly facing dual axially oriented surfaces substantially parallel to the rotational axis of said wheel, each said rim having a rim base edge portion with a radially inclined axially inner surface intersecting an axially oriented radially inner surface intersecting a radially directed axially outer surface and a plurality of clamp lugs integrally secured to said radially directed surface, each said clamp lug having a radially inwardly directed leg portion substantially perpendicular to the rotational axis of each of said rims with a bore therein for receiving said elongated axially projecting component of said fastening assemblies, each said spacer being non-compressible and generally T-shaped in cross section with concave outer and under surfaces tapered inwardly from lateral flange portions and having a radially inwardly projecting medial element with a bore therein for receiving said elongated axially projecting component of said fastening assemblies and being retained thereby between said rims, and further having a length such as to span one of said felloe pockets, each said fastening assembly comprising a threaded fastener and a clamp element supported by said threaded fastener, each said clamp element having lateral wing portions providing downwardly facing dual axially oriented surfaces and a radially outer portion with a radially inclined surface, whereby, said rims when separated by said spacers are seated and locked on said wheel solely by tightening of each of said fastening assembly, said radially inclined axially inner surface of each said inner rim base edge portion being in mating engagement with each said radially inclined felloe surface, and said radially directed leg portion of one of said inner rim clamp lugs being in mating engagement with each said radially directed pocket surface, each said spacer being in mating engagement with said outwardly facing dual axially oriented surfaces on said medial sides of each said felloe pocket, the axially inner lateral flange of each said spacer being in mating engagement with said radially directed leg portion of one of said inner rim clamp lugs, the axially outer lateral flange of each said spacer being in mating engagement with said radially directed leg portion of one of said outer rim clamp lugs, said radially inclined surface on each said clamp element on each said fastening assembly being in mating engagement with said radially inclined axially inner surface of said outer rim base edge portion, said downwardly facing dual axially oriented surfaces on said lateral wing portions of each clamp element on each said fastening assembly being in mating engagement with said outwardly facing dual axially oriented surfaces on said axially outer end of each said felloe pocket.

*5. A combination of dual inner and outer tire carrying rims separated by spacers and seated and locked by fastening assemblies on a vehicle wheel,*

*said wheel having a plurality of spaced-apart felloe portions, each said felloe portion having an outwardly opening pocket thereon, the axially inner end of each said pocket terminating at a radially directed surface substantially perpendicular to the rotational axis of said wheel and providing a mounting location for an elongated axially projecting component of said fastening assemblies, each said radially directed surface intersecting a radially inclined felloe surface, the axially outer end of each said pocket having spaced-apart axially directed wing portions providing for outwardly facing dual axially oriented surfaces extending substantially parallel to the rotational axis of said wheel,*

*each said rim comprising a radially inclined axially inner surface tapering toward an adjacent radially inwardly directed portion oriented substantially perpendicular to the rotational axis of each of said rims with a bore therein for receiving said elongated axially projecting component of said fastening assemblies,*

*each said spacer being non-compressible and comprising an individual element for each said wheel felloe portion with a bore therein for receiving said elongated axially projecting component of said fastening assemblies and being retained thereby between said rims,*

*each said fastening assembly comprising a threaded fastener and a clamp element supported by said threaded fastener, each said clamp element having lateral wing portions providing downwardly facing dual axially oriented surfaces, an axially inwardly directed member and a radially outer portion with a radially inclined surface,*

*whereby, said rims when separated by said spacers are seated and locked on said wheel solely by tightening of each said fastening assembly,*

*said radially inclined axially inner surface on said inner rim being in mating engagement with one of each said radially inclined felloe surfaces, and said radially inwardly directed portion on said inner rim being in mating engagement with one of each said radially directed pocket surfaces,*

*the axially inner end of each said spacer being in mating engagement with said radially inwardly directed portion on said inner rim, the axially outer end of each said spacer being in mating engagement with said radially inwardly directed portion on said outer rim,*

*said radially inclined surface on each said clamp element on each said fastening assembly being in mating engagement with said radially inclined axially inner surface on said outer rim, said downwardly facing dual axially oriented surfaces on said lateral wing portions of each clamp element on each said fastening assembly being in mating engagement with said outwardly facing dual axially oriented surfaces on said axially outer end of each said felloe pocket and said axially inwardly directed member on each said clamp element on each said fastening assembly being in mating engagement with said radially inwardly directed portion on said outer rim.*

*6. A combination of dual inner and outer tire carrying rims separated by spacers and seated and locked by fastening assemblies on a vehicle wheel,*

*said wheel having a plurality of spaced-apart felloe portions, each said felloe portion having an outwardly opening pocket thereon, the axially inner end of each said pocket terminating at a radially directed surface substantially perpendicular to the rotational axis of said wheel and providing a mounting location for an elongated axially projecting component of said fastening assemblies, each said radially directed surface intersecting a radially inclined felloe surface, the axially outer end of each said pocket having spaced-apart axially directed wing portions providing for outwardly facing dual axially oriented surfaces extending substantially parallel to the rotational axis of said wheel,*

*each said rim comprising a radially inclined axially inner surface tapering toward an adjacent radially inwardly directed portion oriented substantially perpendicular to the rotational axis of each of said rims with a bore therein for receiving said elongated axially projecting component of said fastening assemblies and a concave area formed coaxially around said bore,*

*each said spacer being non-compressible and comprising an individual element for each said wheel felloe portion with a bore therein for receiving said elongated axially projecting component of said fastening assemblies and being retained thereby between said rims and with ends having a convex area formed coaxially around said bore,*

*each said fastening assembly comprising a threaded fastener and a clamp element supported by said threaded fastener, each said clamp element having lateral wing portions providing downwardly facing dual axially oriented surfaces, an axially inwardly directed member, and a radially outer portion with a radially inclined surface,*

*whereby, said rims when separated by said spacers are seated and locked on said wheel solely by tightening of each said fastening assembly, said spacers and said inner and outer rim radially inwardly directed portions being mounted in doweled and tenoned relation around said elongated axially projecting component of said fastening assemblies,*

*said radially inclined axially inner surface on said inner rim being in mating engagement with one of each said radially inclined felloe surfaces, and said radially inwardly directed portion on said inner rim being in mating engagement with one of each said radially directed pocket surfaces,*

*said axially inner convex end of each said spacer being in mating engagement with said concave area of said radially inwardly directed portion on said inner rim, said axially outer convex end of each said spacer being in mating engagement with said concave area of said radially inwardly directed portion on said outer rim,*

*said radially inclined surface on each said clamp element on each said fastening assembly being in mating engagement with said radially inclined axially inner surface on said outer rim, said downwardly facing dual axially oriented surfaces on said lateral wing portions of each clamp element on each said fastening assembly being in mating engagement with said outwardly facing dual axially oriented surfaces on said axially outer end of each said felloe pocket and said axially inwardly directed member on each said clamp element on each said fastening assembly being in mating engagement with said radially inwardly directed portion on said outer rim.*

*7. A combination of dual inner and outer tire carrying rims separated by spacers and seated and locked by fastening assemblies on a vehicle wheel,*

*said wheel having a plurality of spaced-apart felloe portions, each said felloe portion having an outwardly opening pocket thereon, the axially inner end of each said pocket terminating at a radially directed surface substantially perpendicular to the rotational axis of said wheel and providing a mounting location for an elongated axially projecting component of said fastening assemblies, each said radially directed surface intersecting a radially inclined felloe surface, the axially outer end of each said pocket having spaced-apart axially directed wing portions providing for outwardly facing dual axially oriented surfaces extending substantially parallel to the rotational axis of said wheel, the medial sides of each said pocket between said radially directed surface and said wing portions having outwardly facing dual axially oriented*

*surfaces substantially parallel to the rotational axis of said wheel,*

*each said rim comprising a radially inclined axially inner surface tapering toward an adjacent radially inwardly directed portion oriented substantially perpendicular to the rotational axis of each of said rims with a bore therein for receiving said elongated axially projecting component of said fastening assemblies,*

*each said spacer being non-compressible and generally T-shaped in cross section with concave outer and under surfaces tapered inwardly from lateral flange portions and having a radially inwardly projecting medial element with a bore therein for receiving said elongated axially projecting component of said fastening assemblies and being retained thereby between said rims, and further having a length such as to span one of said felloe pockets,*

*each said fastening assembly comprising a threaded fastener and a clamp element supported by said threaded fastener, each said clamp element having lateral wing portions providing downwardly facing dual axially oriented surfaces and a radially outer portion with a radially inclined surface,*

*whereby, said rims when separated by said spacers are seated and locked on said wheel solely by tightening of each said fastening assembly,*

*said radially inclined axially inner surface on said inner rim being in mating engagement with one of each said radially inclined felloe surfaces, and said radially inwardly directed portion on said inner rim being in mating engagement with one of each said radially directed pocket surfaces,*

*each said spacer being in mating engagement with said outwardly facing dual axially oriented surfaces on said medial sides of each said felloe pocket, the axially inner lateral flange of each said spacer being in mating engagement with said radially inwardly directed portion on said inner rim, the axially outer lateral flange of each said spacer being in mating engagement with said radially inwardly directed portion on said outer rim,*

*said radially inclined surface on each said clamp element on each said fastening assembly being in mating engagement with said radially inclined axially inner surface on said outer rim, said downwardly facing dual axially oriented surfaces on said lateral wing portions of each clamp element on each said fastening assembly being in mating engagement with said outwardly facing dual axially oriented surfaces on said axially outer end of each said felloe pocket.*

* * * * *